F. R. PARKER.
VOLTAIC CELL AND BATTERY.
APPLICATION FILED MAR. 18, 1914.

1,333,771.

Patented Mar. 16, 1920.

WITNESSES:
Anna Kischel
Theodore E. Kischel

INVENTOR:
Frederick R. Parker.

UNITED STATES PATENT OFFICE.

FREDERICK R. PARKER, OF CHICAGO, ILLINOIS.

VOLTAIC CELL AND BATTERY.

1,333,771.  Specification of Letters Patent.  Patented Mar. 16, 1920.

Original application filed January 29, 1910, Serial No. 540,870. Divided and this application filed March 18, 1914. Serial No. 825,529.

*To all whom it may concern:*

Be it known that I, FREDERICK R. PARKER, a citizen of the United States of America, residing at Chicago, in the county of Cook and State of Illinois, have invented a new and useful Voltaic Cell and Battery, of which the following is a specification, reference being had to the accompanying drawings, illustrating same.

This application is a division of my United States patent application Serial No. 540,870, filed January 29, 1910, which issued into Patent No. 1,182,202, on May 9, 1916.

My invention consists of certain improvements in voltaic cells and batteries, as herein set forth, the principal objects of the invention being, to provide an improved voltaic cell as herein set forth, and improved means for connecting two or more of the cells together to form a battery; and to provide increased efficiency and serviceability, simplicity, durability, and cheapness of manufacture in such cells and batteries. Other objects will be apparent from the following specification.

Figure 1:
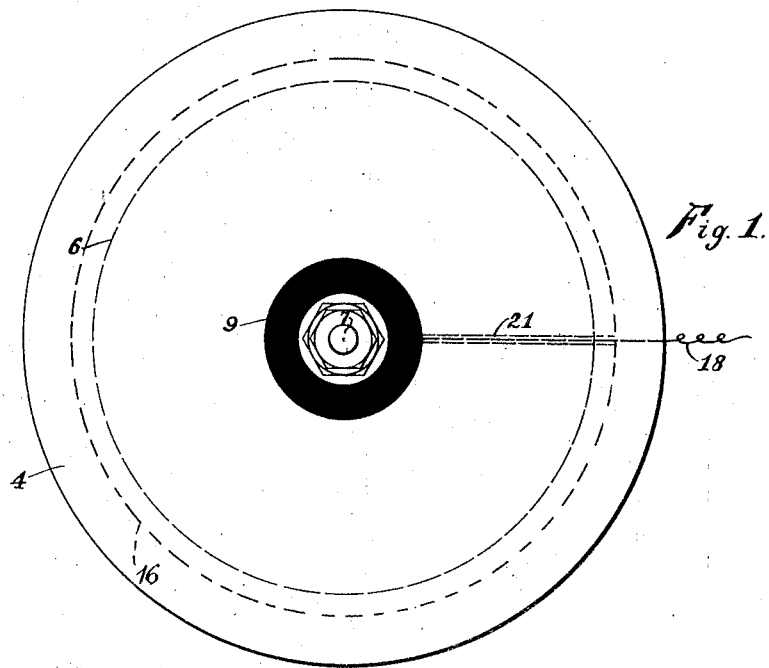
Figure 2:
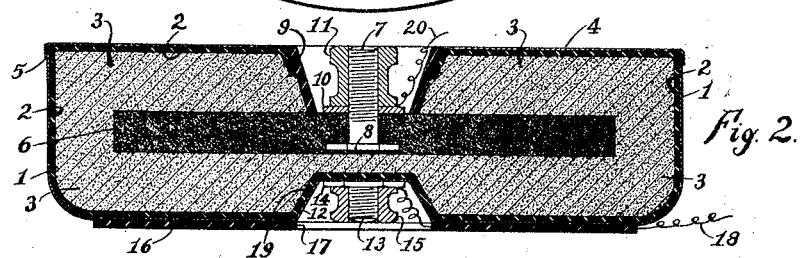
Figure 3:
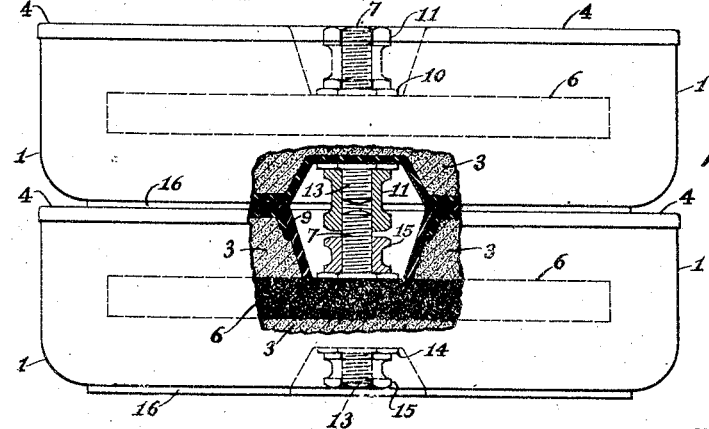

In the accompanying drawings illustrating one form of my invention, Figure 1 is a top or plan view of a voltaic cell of the invention; Fig. 2 is a vertical cross-sectional view of the voltaic cell shown in Fig. 1, with portions shown in elevation; and Fig. 3 is a side elevation of two of the cells shown in Figs. 1 and 2, with portions shown in cross-section, the two cells in this figure being shown connected together to form a battery. Like characters refer to like parts in the several figures.

In this invention I preferably provide a rather broad, flat disk-shaped voltaic cell, to take the place of the ordinary tall dry-cells now in use, which enables me to make the metal casing of my cell of formed sheet metal, preferably zinc which is used as one electrode for the cell, instead of the ordinary soldered-up tall can-like casing heretofore used, and also enables me to stack one cell on another to form a battery. Each of the cells is a complete unit in itself, and may be used as such in an electric circuit, and any number of the cells connected together forms a complete battery, capable of usage wherever a battery is required.

In connecting my cells together I preferably connect the adjacent terminals of adjacent cells direct to each other, as by screwing the cells together, without requiring any extra parts for making such connections, the said connections rigidly holding the cells together as a mechanically rigid battery unit and at the same time electrically connecting the cells together in series. This construction of building a rigid battery unit out of individual cell units, is a great improvement over the ordinary batteries in which a number of cells are set side by side and connected together by short pieces of wire. Furthermore, the connections between my cells cannot loosen, due to jarring, etc., because the body portions of the cells hold on each other and prevent them from unscrewing. Furthermore, on account of my cells being wide and rather flat, they are much less liable to tip over than the ordinary tall dry cells.

On account of my cells being rather broad and flat they are very easy to fill with the excitant-depolarizer material, either by machinery or by hand, and therefore this material may be packed in very uniformly throughout the body of the cell, thus giving a very uniform electrical output for all cells. Again, on account of the shallowness of the cell, the moisture is distributed more uniformly throughout the body thereof during its whole life, because it cannot settle far from the top of the cell. Thus, with this construction all of the zinc of the casing is fully active during the whole life of the cell, because the filling material does not get excessively dry at the top nor excessively hard and inactive at the bottom. This enables me to make a smaller and lighter-weight cell than the ordinary, and consequently cheaper, for a certain electrical output. Furthermore, with my construction I can employ a much greater extent of zinc surface, or surface of the outer electrode, for a given amount of filling material. These features give greatly increased efficiency in the cells of this invention.

I will now describe my invention more in detail by reference to the drawings, in which 1 and 4 constitute a two-part casing for the cell, said casing being preferably made of zinc and being used as one electrode of the cell. On account of the wide shallow proportions of the cell I preferably form the portions 1 and 4 of the casing from sheet-metal by means of forming punches and dies. Located medially within the casing 1, 4 is the other electrode of the cell, preferably a circular carbon disk 6. Filling the casing 1, 4 and surrounding the electrode 6 is the excitant-depolarizer material 3, which may be a mixture of salammoniac, manganese-dioxid, carbon dust and water, with or without other ingredients, or some other suitable chemical mixture adapted to give the required results. The casing 1, 4, if made of zinc, is lined on the inside with a porous insulating material 2, such as soft paper or other suitable material, to prevent the filling material 3 from coming into actual contact with the casing 1, 4 but at the same time allowing the moisture of the excitant material, or the electrolyte, to soak through the lining 2 and thus come into contact with the zinc 1, 4 to chemically act thereon and thereby produce the voltaic energy of the cell. If the material 3 were permitted to come into actual contact with the zinc 1, 4 it would short-circuit the cell and thus destroy same. If desired, I may corrugate either the electrode 1, 4, or the surface of the electrode 6, or both, to increase the surface thereof. I may also amalgamate the zinc 1, 4 if desired, to prevent chemical action thereon when the cell is at rest. The casing 1 is preferably recessed as at 12, to accommodate a short terminal post 13 the head 14 of which is preferably soldered to the casing 1 as shown. I preferably insulate the recessed portion 12 of the zinc casing 1 from the excitant material 3, by means of an insulating cap 19 placed over the portion 12, or by coating the portion 12 with an insulating enamel on its inner surface, to prevent too quick consumption of the zinc at this point where the internal resistance of the cell may be somewhat reduced on account of the recessed formation 12 of the casing. The post 13 is provided with a short thumb-nut 15 under which a conductor 18 may be connected. With this short post 13 set within the recessed portion 12 of the casing 1, the cell may sit flat on its base without resting on the post 13. On the bottom of the cell is preferably cemented an insulating cushion member 16, such as rubber, asbestos, cardboard, or other suitable material, to provide a cushion and insulating member for the cell or between the cells when two or more are connected together as shown in Fig. 3. The member 16 is preferably grooved or slit from the central opening 17 therein to the outer edge thereof, as shown at 21, to accommodate the conductor 18 leading from the terminal post 13.

The electrode 6 carries a long terminal post 7 having a head suitably formed to prevent the post 7 from turning, the post 7 preferably projecting through the electrode 6 and having its head covered with suitable sealing material 8, such as sealing wax, or other suitable material, to protect it from the action of the excitant material 3. The post 7 preferably carries a thin nut 10 and a long thumb-nut 11, between which a conductor 20 may be connected. When the excitant-depolarizer material 3 is put into the casing 1, 4 evenly around the electrode 6 as shown, said material 3 completely filling the casing 1, 4, the cell is then put under a gentle pressure sufficient to press the material 3 snugly into place in the casing 1, 4 and around the electrode 6, after which the two parts 1 and 4 of the casing are soldered together at 5 clear around the cell to hold the parts in their proper assembled condition, and then the cell is finally sealed at 9 around the terminal post 7, from the central opening at 9 in the portion 4 of the casing to the electrode 6, by suitable insulating sealing material 9 such as pitch or some other suitable material. The cell being sealed in this manner provides a recess in the body portion of the cell for accommodating the long terminal post 7 and the long thumb-nut 11.

When it is desired to connect two or more of the cells together to form a battery, it is only necessary to reverse the adjacent long and short thumb-nuts 11 and 15 on the adjacent long and short terminal posts 7 and 13, and then screw the cells together bodily whereupon both of the adjacent posts are screwed into the long nut 11 as shown in Fig. 3. This connection electrically connects the cells together in series, and also mechanically connects them together into a rigid battery unit. The casings of the adjacent cells are kept insulated from each other by the interposed insulating member 16, and the cells hold on each other over a large surface so as to prevent the connections between them from loosening. With this means of connecting the cells together there are no extra parts required and no parts discarded in making the connections—likewise neither are any extra parts required or any parts discarded when a battery of a number of cells is separated into a number of separate cells or batteries. Each cell is a complete unit in itself and it may be used by itself or as an element of a battery. Whether one or more of the cells are used as a battery or source of electrical supply, such battery is always complete in itself. Likewise, when a battery of a number of cells is divided into two or more batteries, each divisional battery so formed is complete in itself. Such a complete cell with complete terminals is shown in Fig. 2 of the drawings, and such a complete battery with complete terminals is shown in Fig. 3. The advantages of this feature of the invention can be readily seen.

From the foregoing it will be seen that the intermediate terminals of a battery of my cells are incased or inclosed by the cells and therefore protected from foreign objects and climatic attacks. It will also be seen that the terminal posts and nuts do not project out past the body portions of the cells and are therefore not liable to be broken off or damaged. This feature is of great advantage in packing, shipping and handling the cells.

My cells do not dry out appreciably through long standing, on account of the metal casing, 1, 4 almost completely inclosing the interior of the cell and the sealed portion 9 effectively preventing drying out over its small area. Furthermore, in a battery of a number of cells the sealed portions 9 being incased by the casings of the adjacent cells provides a double preventive against drying out at these points.

While I preferably use my cells and batteries in the upright position illustrated, they may be used in other positions if desired, such as on their side or upside down.

I wish it to be understood that I may make the terminal post 13 the long one and the terminal post 7 the short one if I desire.

Modified forms of the present invention form the subject-matter of my co-pending United States applications Serial Nos. 96,066 and 96,067, filed May 8, 1916.

I do not wish to limit this invention to all of the particular details herein set forth, nor to the exact materials mentioned, nor to the exact shape, size, or construction of the cell and battery as shown, as various modifications thereof may be made or utilized without departing from the scope of the appended claims.

What I claim herein as my invention is:

1. A disk-shape voltaic cell having an electrode forming a casing for the contents of the cell, a disk-shaped electrode disposed medially within the said casing, a porous lining of insulating material for one of the said electrodes, moist excitant-depolarizer material filling the said casing on both sides of the said medially-disposed electrode, a terminal post attached to the said casing on one side of the cell and located within a recess in the said casing, another terminal post attached to the said medially-disposed electrode and projecting out of the cell at a point where an opening is provided in the said casing on the opposite side of the cell from the first said terminal post, and insulating sealing material sealing the cell where the said terminal post projects therefrom and providing a recess in the body portion of the cell for containing the last-mentioned said post.

2. A voltaic cell having an electrode forming a casing for the contents of the cell, an electrode disposed medially within one of the said electrodes, a porous lining of insulating material for the said casing, moist excitant-depolarizer material filling the said casing on both sides of the said medially-disposed electrode, a terminal post attached to the said casing and located within a recess therein, another terminal post attached to the said medially-disposed electrode and projecting out of the cell at a point where an opening is provided in the said casing, and insulating sealing material sealing the cell where the said terminal post projects therefrom and providing a recess in the body portion of the cell for containing the last-mentioned said post.

3. In a voltaic cell having greater breadth than height when in an upright position, a casing for the contents of the cell constituting one of the electrodes thereof, a plate-like electrode for the cell disposed horizontally therein and medially with respect to the top and bottom of the cell when the cell is in said upright position, a porous lining of insulating material for one of the said electrodes, excitant-depolarizer material within the said casing on both sides of the said medially-disposed electrode, and means on opposite sides of the cell for making electrical connections with the respective electrodes.

4. A voltaic cell having an electrode forming a casing for the contents of the cell, an electrode disposed medially within the said casing, a porous lining of insulating material for one of the said electrodes, moist excitant-depolarizer material within the said casing on both sides of the said medially-disposed electrode, a terminal post attached to the said casing on one side of the cell, and another terminal post attached to the said medially-disposed electrode and projecting out of the cell at a point where an opening is provided in the said casing on the opposite side of the cell from the first said terminal post.

5. A disk-shaped voltaic cell having a two-part conducting casing for the contents of the cell the parts of which are electrically connected and form an electrode for the cell, a disk-shaped electrode disposed medially within the said casing, a porous lining of insulating material for one of the said electrodes, moist excitant-depolarizer material filling the said casing on both sides of the said medially-disposed electrode, the said filling material being held under pressure by the said casing, a short screw terminal post attached to the exterior of the said casing on one side of the cell and located within a centrally-disposed recess in the said casing, a long screw terminal post attached to the central portion of the said medially-disposed electrode and projecting out of the cell at a central opening in the said casing on the opposite side of the cell from the first said terminal post, insulating sealing material sealing the said opening in the casing around the said long terminal post whereby the cell is sealed air-tight, and providing a recess in the body portion of the cell for containing the said long terminal post, and long and short nuts for the said long and short posts, respectively.

6. In a voltaic cell having greater breadth than height when in an upright position, a casing for the contents of the cell constituting one of the electrodes thereof, a plate-like electrode for the cell disposed horizontally therein and medially with respect to the top and bottom of the cell when the cell is in said upright position, excitant material within the said casing on both sides of the said medially-disposed electrode, and means on opposite sides of the cell for making electrical connections with the respective electrodes.

7. In a voltaic cell having greater breadth than height when in an upright position, a container for the contents of the cell constituting one of the electrodes thereof, another electrode for the cell disposed horizontally therein and medially with respect to the top and bottom of the cell when the cell is in said upright position, and electrolytic material within the said container on both sides of the said medially-disposed electrode.

8. A cake-like dry cell having an electrode forming a casing for the contents of the cell, a plate-like electrode concentrically located within the said casing and medially disposed therein with respect to the thickness of the cell, a porous lining of insulating material for one of the said electrodes, excitant-depolarizer material packed within the said casing on both sides of the said medially-disposed electrode, and means on opposite sides of the cell for making electrical connections with the respective electrodes.

9. A disk-shaped voltaic cell having an electrode forming a casing for the contents of the cell, a plate-like electrode disposed medially within the said casing with respect to the thickness of the cell, a porous lining of insulating material for one of the said electrodes, excitant material within the said casing on both sides of the said medially-disposed electrode, and means on opposite sides of the cell for making electrical connections with the respective electrodes.

10. A disk-shaped voltaic cell having an electrode forming a casing for the contents of the cell, a plate-like electrode disposed medially within the said casing with respect to the thickness of the cell, a porous lining of insulating material for one of the said electrodes, and excitant material within the said casing on both sides of the said medially-disposed electrode.

11. A cake-like dry cell having an electrode forming a casing for the contents of the cell, a plate-like electrode concentrically located within the said casing and medially disposed therein with respect to the thickness of the cell, a porous lining of insulating material for one of the said electrodes, and excitant-depolarizer material packed within the said casing on both sides of the said medially-disposed electrode.

12. A cake-like voltaic cell having an electrode forming a casing for the contents of the cell, a plate-like electrode concentrically located within the said casing and medially disposed therein with respect to the thickness of the cell, and excitant material within the said casing on both sides of the said medially-disposed electrode.

13. A disk-shaped voltaic cell having an electrode forming a casing for the contents of the cell, a plate-like electrode disposed medially within the said casing with respect to the thickness of the cell, and excitant material within the said casing on both sides of the said medially-disposed electrode.

14. In a voltaic cell having greater breadth than height when in an upright position, a casing for the contents of the cell constituting one of the electrodes thereof, a plate-like electrode for the cell disposed horizontally therein and medially with respect to the top and bottom of the cell when the cell is in said upright position, a porous lining of insulating material for one of the said electrodes, and excitant-depolarizer material within the said casing on both sides of the said medially-disposed electrode.

15. In a voltaic cell having greater breadth than height when in an upright position, a casing for the contents of the cell constituting one of the electrodes thereof, a plate-like electrode for the cell disposed horizontally therein and medially with respect to the top and bottom of the cell when the cell is in said upright position, and excitant material within the said casing on both sides of the said medially-disposed electrode.

16. In a voltaic cell having greater breadth than height when in an upright position, a two-part conducting casing for the contents of the cell the parts of which are electrically connected and form an electrode for the cell, a plate-like electrode for the cell disposed horizontally therein and medially with respect to the top and bottom of the cell when the cell is in said upright position, a porous lining of insulating material for one of the said electrodes, excitant-depolarizer material filling the said casing on both sides of the said medially-disposed electrode and held under pressure by the said casing, and suitable terminals for the respective electrodes.

17. A voltaic cell having an electrode forming a casing for the contents of the cell, an electrode disposed medially within the said casing, a porous lining of insulating material for one of the said electrodes, moist excitant-depolarizer material filling the said casing between the said electrodes, a terminal member for the said medially-disposed electrode projecting out of the cell, and insulating material sealing the cell around the said terminal member and providing a recess within the confines of the said casing for containing the said terminal member.

18. A cake-like voltaic cell having a two-part conducting casing for the contents of the cell the parts of which are electrically connected and form an electrode for the cell, a plate-like electrode for the cell medially disposed within the said casing with respect to the thickness of the cell, a porous lining of insulating material for one of the said electrodes, and excitant-depolarizer material filling the said casing on both sides of the said medially-disposed electrode and held under pressure by the said casing.

19. A cake-like voltaic cell having a two-part conducting casing for the contents of the cell the parts of which are electrically connected and form an electrode for the cell, a plate-like electrode for the cell concentrically located within the said casing and medially disposed therein with respect to the thickness of the cell, a porous lining of insulating material for one of the said electrodes, excitant-depolarizer material filling the said casing on both sides of the said medially-disposed electrode and held under pressure by the said casing, and means on opposite sides of the cell for making electrical connections with the respective electrodes.

20. A voltaic cell having an exterior electrode, an interior electrode, and excitant material between the electrodes, the interior electrode having a terminal member therefor located in a cup-shaped recess within the exterior electrode opening out of the cell.

As inventor of the foregoing I hereunto subscribe my name, this 14th day of March, 1914.

FREDERICK R. PARKER.

Witnesses:
 ANNA KISCHEL,
 THEODORE E. KISCHEL.